(12) United States Patent
Endo et al.

(10) Patent No.: US 6,731,350 B2
(45) Date of Patent: May 4, 2004

(54) VEHICLE-MOUNTED DISPLAY SYSTEM (75) Inventors: Masashi Endo, Iwaki (JP); Seiko Nakasuna, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 368 days.

(21) Appl. No.: 09/839,623

(22) Filed: Apr. 19, 2001

(65) Prior Publication Data

US 2002/0001049 A1 Jan. 3, 2002

(30) Foreign Application Priority Data

Apr. 20, 2000 (JP) ........................................ 2000-119650

(51) Int. Cl.$^7$ ................................................ H04N 5/64

(52) U.S. Cl. ..................... 348/837; 74/89.17; 312/319.5

(58) Field of Search ............................. 345/87; 348/837, 348/836; 312/319.5, 319.6, 319.7, 319.8, 7.2, 323; 74/422, 89.17

(56) References Cited

U.S. PATENT DOCUMENTS

| | | | | |
|---|---|---|---|---|
| 4,757,725 A | * | 7/1988 | Beugin ........................ | 74/422 |
| 5,362,144 A | * | 11/1994 | Shioya et al. ............ | 312/319.6 |
| 5,847,685 A | | 12/1998 | Otsuki ........................ | 345/87 |

FOREIGN PATENT DOCUMENTS

| | | | | |
|---|---|---|---|---|
| JP | 406092187 A | * | 4/1994 | ................ 348/837 |

* cited by examiner

*Primary Examiner*—Lanna Mai
*Assistant Examiner*—Jerry A. Anderson
(74) *Attorney, Agent, or Firm*—Brinks Hofer Gilson & Lione (57) ABSTRACT

In the structure of a vehicle-mounted display system, a pair of racks, that is, a first rack and a second rack, are secured to a sliding chassis which can move forward and backward inside a case. A pair of arms, that is, a first arm and a second arm, are swingably supported by a movable base which rotatably supports a monitor, with a third motor serving as a driving source of the monitor being disposed between the pair of arms. A first gear that engages the first rack and a first motor serving as a driving source of the first gear are installed on the first arm. A second gear which engages the second rack and a second motor serving as a driving source of the second gear are installed on the second arm. When the monitor is drawn in and out, both motors are operated in order to move both gears along their corresponding racks in the same direction, as a result of which the movable base is moved forward and backward. When adjustments are made in the viewing angle of the monitor, both of the motors are operated differently from each other in order to integrally rotate the movable base and the monitor. The invention provides a vehicle-mounted display system which can adjust the viewing angle of the monitor using electrical power by a simple structure.

20 Claims, 4 Drawing Sheets

VEHICLE-MOUNTED DISPLAY SYSTEM

BACKGROUND OF THE INVENTION

1. Field of the Invention

The present invention relates to a vehicle-mounted display system where a monitor, such as a liquid crystal display (LCD) device, is accommodated in the body of the system and operable to be drawn out and raised. In particular, the present invention relates to a vehicle-mounted display system which is constructed so that the viewing angle of the monitor in the raised state can be adjusted towards the left and right.

2. Description of the Related Art

In recent years, there has been strikingly widespread use of vehicle-mounted display systems which are constructed so that a monitor, such as a liquid crystal display (LCD) device, is accommodated in the body of the system, and so that the body of the system is mounted to a dashboard inside the vehicle so as to move into and out of the dashboard. In general, such vehicle-mounted display systems are constructed with a movable base which has a monitor installed thereon. The movable may be moved forward in a horizontal direction by a loading mechanism which uses a motor as a drive source. The monitor is disposed at a location reached after the movable plate has moved forward and is raised by a tilting mechanism that uses a different motor as a drive source. In the raised state, the monitor always faces the front side. Consequently, the display screen of the monitor is tilted from the line of sight of a passenger. Thus, when, in particular, the liquid crystal display device is used as a monitor, the display screen of the monitor becomes very difficult to see because of the viewing angle.

To overcome this problem, in recent years, a vehicle-mounted display system has been proposed that can adjust the viewing angle of the monitor towards the left and right by manually operating an angle adjusting mechanism that, in turn, can rotate the monitor in the raised state around a vertical axis. When such an angle adjusting mechanism is used, the posture of the monitor in the raised state can be adjusted to an optimum angle with respect to the passenger, so that the passenger can easily see the display screen of the monitor.

When a vehicle-mounted display system which manually adjusts the viewing angle of the monitor is used, the operations from the drawing out of the monitor to the raising of the motor are carried out using electrical power or a motor as a drive source, but, after these operations have been carried out, the angle of the monitor must be manually adjusted. Therefore, even when the monitor is to be accommodated inside a front panel, the posture of the monitor must be returned manually to its front-side-facing posture. Thus, a troublesome operation must be carried out by the passenger. Additionally, fine adjustments of angles are difficult to carry out because the angle of the monitor is adjusted manually.

Along with the loading mechanism of the movable base and the tilting mechanism of the monitor, a special-purpose rotary mechanism which uses a motor as a drive source may be added in order to adjust the angle of the monitor using electrical power by the rotary mechanism. However, in this case, various mechanisms need to be installed within the limited space of the movable base. This not only results in increased thickness and size of the whole system, but also in an additional problem that the structure becomes very complicated.

SUMMARY OF THE INVENTION

Accordingly, in view of the conventional problems, it is an object of the present invention to provide a vehicle-mounted display system that can easily adjust the viewing angle of a motor by electrical power using a simple structure.

In the present invention, by controlling the directions and amounts of rotation of two motors which are supported by a movable base, the forward and backward movements of the movable base and the adjustments of the viewing angle of a monitor are selectively carried out using both of these motors. This makes it possible to adjust the viewing angle of the monitor using electrical power, and to use a common driving system for moving the movable base forward and backward and for adjusting the viewing angle of the monitor. These are suitable for simplifying the whole structure of the vehicle-mounted display system and for reducing its size.

To this end, according to one aspect of the present invention, there is provided a vehicle-mounted display system comprising a pair of racks which extend along a forward-and-backward dimension of a case so as to be parallel to each other, a pair of gears which engage the racks, a pair of motors for separately and rotationally driving the gears, a movable base for supporting the gears and the motors, and a monitor which is rotatably provided at the movable base. In the vehicle-mounted display system, when the monitor is in a horizontal posture, the amount of movement of both gears with respect to both racks is the same in a same direction. This allows the movable base to move forward and backward along the direction of extension of both of the racks. On the other hand, when the monitor is in a raised posture, the amounts of movement of both gears with respect to both racks are different from each other in order to rotate the movable base within a plane which is parallel to a plane which includes both of the racks.

In the vehicle-mounted display system having the above-described structure, when the amounts of movement of both gears with respect to both racks are made the same in the same direction, the movable base and the monitor move forward and backward along the direction of extension of both of the racks. On the hand, when the amount of movement of one of the gears with respect to its corresponding rack is different from the amount of movement of the other of the gears with respect to its corresponding rack, the viewing angle of the monitor is adjusted as a result of rotating the movable base at the location which it has reached after moving forward. Therefore, by controlling the amounts and directions of movement of the two motors which are supported by the movable base, the forward and backward movements of the movable base and the adjustments of the viewing angle of the monitor can be carried out by a common driving system, so that the whole structure can be simplified and reduced in size.

In one form of one aspect of the present invention, a pair of arms may be swingably axially supported by the movable base and the gears and motors are supported by their corresponding arms, and a rotational biasing force may be applied to both arms in one direction using, for example, springs. Here, it is preferable that the gears be resiliently urged in the direction in which they engage their corresponding racks. When these arm mechanisms are used, the gears and their corresponding racks can be kept engaged by the swinging of the arms when the movable base rotates.

When a pair of arms are swingably axially supported by the movable base and the gears and motors are supported by their corresponding arms, and a rotational biasing force is applied to both arms in one direction using, for example, springs, a driving mechanism for rotating the monitor may be installed at the center portion of the movable base, and the centers of swinging of both of the arms may be set at opposing locations through the driving mechanism. By virtue of this structure, the driving mechanism and both arms can be properly set within the limited space of the movable base. This makes the present invention more effective in achieving size reduction.

In another form of one aspect of the present invention, the pair of racks may be provided so that ends of the teeth thereof face each other or face away from each other, and the pair of gears which engage their corresponding racks may be disposed in the same plane, so that the racks and the gears are not placed upon each other. By virtue of this structure, the amounts of protrusion in the thickness direction can be reduced. Reducing the amounts of protrusion contributes to reducing the thickness of the display system.

According to another aspect of the present invention, there is provided a vehicle-mounted display system in which the movable base is rotatably supported, and in which a guide plate which is guided by a guide member and which is movable only in the direction of extension of the guide member is provided. Here, the movable base is moved forward and backward along the direction of extension of the guide member when the monitor is a horizontal posture. On the other hand, when the monitor is in a raised posture, the movable base is rotated with respect to the guide plate. By virtue of this structure, the monitor is reliably moved into and out of the case, and the monitor which is in the raised posture can be reliably rotated.

At least two guide pins may be provided at the guide plate, and one of the guide pins may be made the center of rotation of the movable plate. By virtue of this structure, parts can be used in common, the structure becomes less complicated, and costs can be reduced.

DESCRIPTION OF THE PREFERRED EMBODIMENT

Figure 1:
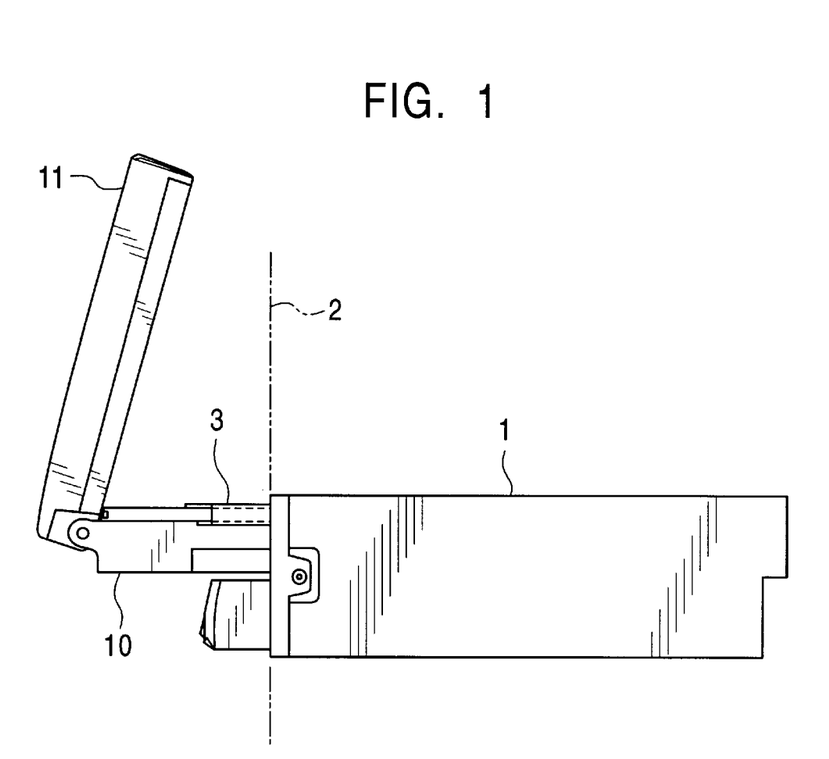
FIG. 1 is a side view of an embodiment of a vehicle-mounted display system in accordance with the present invention.
Figure 2:
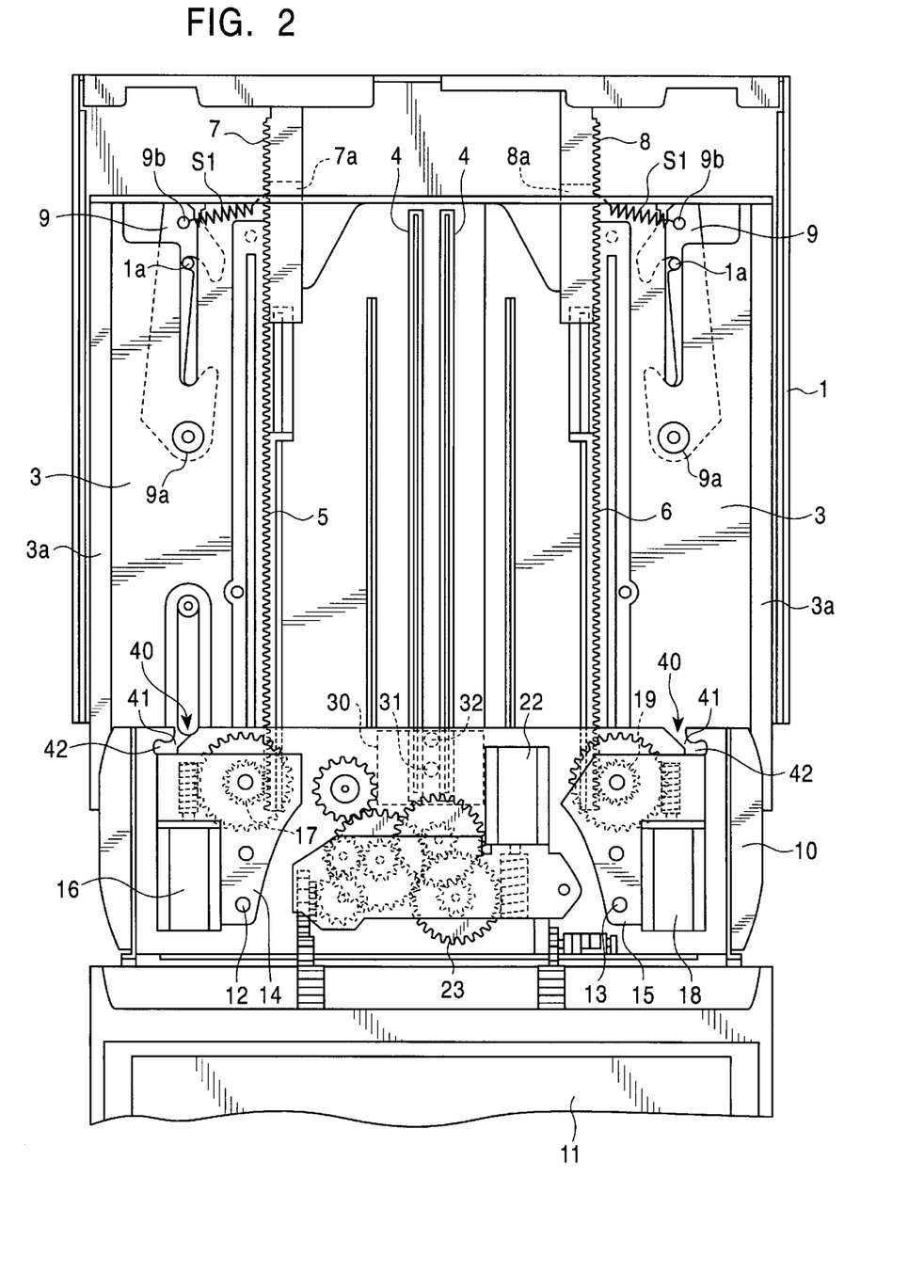
FIG. 2 is a bottom view showing the internal mechanism of the display system.
Figure 3:
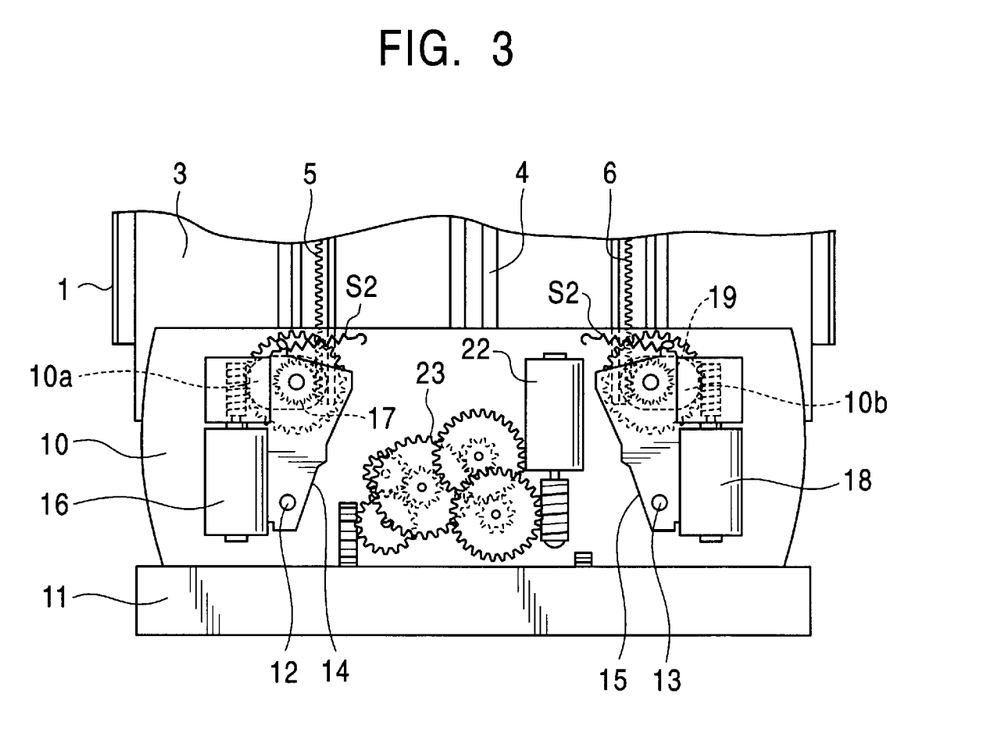
FIG. 3 illustrates the main portion of a movable base of the display system.
Figure 4:
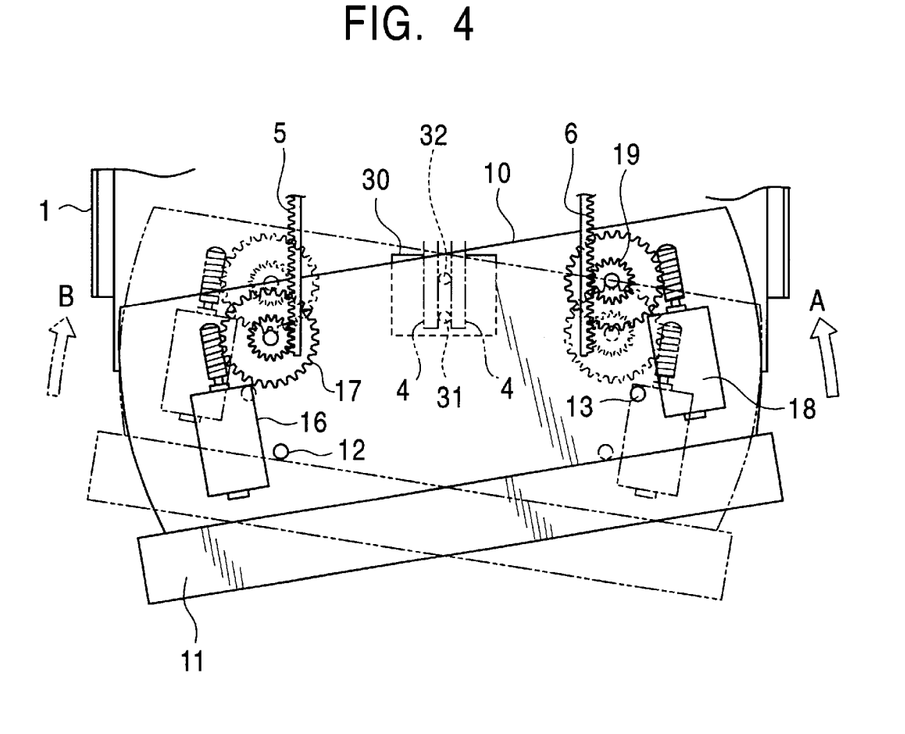
FIG. 4 illustrates an adjusting operation of the angle of a monitor.

A preferred embodiment of the present invention will be described with reference to the drawings. FIG. 1 is a side view of an embodiment of a vehicle-mounted display system in accordance with the present invention. FIG. 2 is a bottom view of the internal mechanism of the display system. FIG. 3 illustrates the main portion of a movable base of the display system. FIG. 4 illustrates an adjusting operation of the angle of a monitor.

Referring to FIGS. 1 to 4, reference numeral 1 denotes a case which forms the outer shell of a display system. The case 1 is mounted to a dashboard 2 disposed inside the vehicle. A sliding chassis 3 is disposed inside the case 1 so as to be movable forward and backward. A first rack 5 and a second rack 6 are secured to the sliding chassis 3, with guide rails 4 being disposed at the center of the sliding chassis 3. The guide rails 4 and the first and second racks 5 and 6 extend forward and backward parallel to each other. At the back side of the case 1, racks 7 and 8 are continuously secured to the first and second racks 5 and 6, respectively. The racks 7 and 8 have corresponding spaces 7a and 8a formed therein for allowing the corresponding first and second racks 5 and 6 to move into them. The end of the teeth of the first rack 5 and the end of the teeth of the second rack 6 are formed so as to face each other or so as to face away from each other. Similarly, the end of the teeth of the rack 7 and the end of the teeth of the rack 8 are formed so as to face each other or so as to face away from each other. The first and second racks 5 and 6 and the corresponding racks 7 and 8 may be disposed so as to face each other.

Pins 1a and 1a are provided at the case 1. At the sliding chassis 3, lock levers 9 and 9 are rotatably supported by rotary pins 9a and 9a. The lock levers 9 and 9 are always urged in the direction in which the lock levers 9 and 9 are fitted to the pins 1a and 1a by springs S1 and S1 which are tightly stretched between ends of the lock levers 9 and 9 and the sliding chassis 3. When the lock levers 9 and 9 are fitted to the pins 1a and 1a, the sliding chassis 3 is locked at the case 1, thereby preventing the sliding chassis 3 from advancing any further with respect to the case 1. By changing the locations of the pins 1a and 1a, the amount of forward movement of the sliding chassis 3 can be changed. Disengaging pins 9b and 9b are provided in a standing manner on the lock levers 9 and 9.

Guides 3a which are U-shaped in cross section are formed on both the left and right sides of the sliding chassis 3. Both sides of a movable base 10 are inserted into these guides 3a. Both sides of the movable base 10 are formed with the shape of a circular arc. A monitor 11, or a liquid crystal display (LCD) device, is supported at ends of the movable base 10.

A pair of pins 12 and 13 are implanted in the movable base 10. A first arm 14 and a second arm 15 are swingably, i.e., rotatably, supported by these corresponding pins 12 and 13. A first motor 16 and a first gear 17 which rotates using the motor 16 as a drive source are installed on the first arm 14. The first gear 17 engages the first rack 5. Similarly, a second motor 18 and a second gear 19 which rotates using the motor 18 as a drive source are installed on the second arm 15. The second gear 19 engages the second rack 6. A pair of clearance holes 10a and 10b are formed in the movable base 10. Both of the gears 17 and 19 are inserted into the corresponding clearance holes 10a and 10b, and engage their corresponding racks 5 and 6. Springs S2 and S2 are stretched between a cover (not shown) which covers the movable base 10 and both of the arms 14 and 15, respectively. Both of the gears 17 and 19 are subjected to the resilient forces from their corresponding springs S2 and S2, and engage their corresponding racks 5 and 6. A third motor 22 and a speed-reduction gear train 23 are mounted on the center portion of the movable base 10. With the motor 22 as a drive source, the monitor 11 is such as to switch between the horizontal posture and the raised posture as a result of rotating.

A pair of pins 12 and 13 are implanted in the movable base 10. A first arm 14 and a second arm 15 are swingably (that is, rotatably) supported by these corresponding pins 12 and 13. A first motor 16 and a first gear 17 which rotates using the motor 16 as a drive source are installed on the first arm 14. The first gear 17 engages the first rack 5. Similarly, a second motor 18 and a second gear 19 which rotates using the motor 18 as a drive source are installed on the second arm 15. The second gear 19 engages the second rack 6. A pair of clearance holes 10a and 10b are formed in the movable base 10. Both of the gears 17 and 19 are inserted into the corresponding clearance holes 10a and 10b, and engage their corresponding racks 5 and 6. Springs S2 and S2 are stretched between a cover (not shown) which covers the movable base 10 and both of the arms 14 and 15, respectively. Both of the gears 17 and 19 are subjected to the resilient forces from their corresponding springs S2 and S2, and engage their corresponding racks 5 and 6. A third motor 22 and a speed-reduction gear train 23 are mounted on the center portion of the movable base 10. With the motor 22 as a drive source, the monitor 11 may move between the horizontal posture and the raised posture as a result of rotating.

A pair of lock grooves 40 and 40 are formed in the movable base 10. The lock grooves 40 and 40 comprise corresponding inclined portions 41 and 41 and corresponding lock portions 42 and 42 which are formed continuously with their corresponding inclined portions 41 and 41. The disengaging pins 9b and 9b are inserted from their corresponding inclined portions 41 and 41 so as to reach their corresponding lock portions 42 and 42. When the disengaging pins 9b and 9b move along their corresponding inclined portions 41 and 41, the lock levers 9 and 9 rotate against their corresponding springs S1 and S1, whereby the lock levers 9 and 9 and their corresponding pins 1a and 1a can be disengaged from each other. When the disengaging pins 9b and 9b move to their corresponding lock portions 42 and 42, the lock levers 9 and 9 and the movable base 10 are in a locked state, making it possible for the movable base 10 and the sliding chassis 3 which supports the lock levers 9 and 9 to move integrally.

A guide plate 30 is provided at substantially the center of the movable base 10. The guide plate 30 is disposed between the movable base 10 and the sliding chassis 3, and is supported by a rotary shaft 31 so as to be rotatable with respect to the movable base 10. The rotary shaft 31 is provided so as to protrude towards the sliding chassis 3 side. A guide pin 32 is provided on the guide plate 30 so as to protrude towards the sliding chassis 3 side. The guide pin 32 and the rotary shaft 31 are inserted between the guide rails 4 and 4, so that the guide plate 30 is always guided and moves in the direction of extension of the guide rails 4 and 4.

A description will now be given of the operation of the embodiment of the vehicle-mounted display system.

In a closed state in which the monitor 11 is accommodated inside the front panel 2, both gears 17 and 19 engage their corresponding racks 7 and 8 which are secured to the case 1. The sliding chassis 3 and the movable base 10 are both moved to the back side of the case 1, so that the monitor 11 is accommodated inside the case 1 in a horizontal posture. In this state, since the disengaging pins 9b and 9b are inserted in their corresponding lock portions 42 and 42, the sliding chassis 3 and the movable base 10 are in a locked state, and the lock levers 9 and 9 are rotated in the direction in which they are disengaged from their corresponding pins 1a and 1a. In other words, the sliding chassis 3 and the movable base 10 are integrally movable towards the front of the case 1. When, in the closed state, an opening button (not shown) is thrown, the first and second motors 16 and 18 operate, causing both gears 17 and 19 to start rotating at equal speeds. When the gears 17 and 19 start rotating, they move towards the front side of the case 1 while engaging their corresponding racks 7 and 8. In other words, since the sliding chassis 3 and the movable base 10 move integrally towards the front side of the case 1, the first and second racks 5 and 6 move out from the spaces 7a and 8a of the racks 7 and 8, respectively. In addition, the lock levers 9 and 9 come into contact with their corresponding pins 1a and 1a, and rotate in the urging directions of the springs S1 and S1. When the rotation is completed, the lock levers 9 and 9 engage their corresponding pins 1a and 1a, so that the sliding chassis 3 does not move any further towards the front side of the case 1 from this position. Here, the disengaging pins 9b and 9b are operable to separate from their corresponding lock portions 42 and 42.

Here, even when the sliding chassis 3 stops moving, both gears 17 and 19 engage their corresponding racks 7 and 8 and continue moving. Then, along the way, the portions with which the gears 17 and 19 engage switch to the first and second racks 5 and 6, so that gears 17 and 19 move while they engage the first and second racks 5 and 6. In other words, since the movable base 10 moves towards the front side of the case 1 with respect to the sliding chassis 3, the monitor 11 which is supported on the movable base 10 is such as to protrude from the case 1. Accordingly, the movable base 10 and the monitor 11 move forward. When, as shown in FIG. 2, the monitor 11 protrudes completely from the case 1, the first and second motors 16 and 18 stop based on a detection signal from a detection switch (not shown), and the third monitor 22 operates instead. This causes the monitor 11 to start to rotate. When, as shown in FIG. 1, the monitor 11 is completely raised, the third motor 22 stops. In this case, since the display screen of the monitor 11 faces the front side, the viewing angle of the monitor 11 is adjusted following the stopping of the third motor 22.

For example, in the case where the monitor 11 rotates counterclockwise in FIG. 3, while the first motor 16 is stopped, only the second motor 18 operates in order to cause the second gear 19 to retreat along the second rack 6, as illustrated by the solid lines shown in FIG. 4. This causes the movable base 10 to rotate in the direction of arrow A shown in FIG. 4 with the rotary shaft 31 of the guide plate 30 as a reference, so that the monitor 11 which is mounted on the movable base 10 also moves in the same direction, causing the viewing angle to be adjusted to an optimum angle with respect to the passenger who is at the right side of the monitor 11. Here, the movable base 10 rotates with respect to the second gear 19 which extends in a straight line, so that the relative positions between the second gear 19 and the second rack 6 change. However, this relative change is accommodated by the swinging of the second arm 15 which supports the second motor 18 and the second gear 19 with a pin 13 as a center.

In the case where the monitor 11 rotates clockwise in FIG. 3, while the second motor 18 is stopped, only the first motor 16 operates in order to cause the first gear 17 to retreat along the first rack 5, as illustrated by the alternate long and two short dashed lines shown in FIG. 4. This causes the movable base 10 to rotate in the direction of arrow B shown in FIG. 4 with the rotary shaft 31 of the guide plate 30 as a reference, so that the monitor 11 which is mounted on the movable base 10 rotates in the same direction, causing the viewing angle to be adjusted to an optimum angle with respect to the passenger who is at the left side of the monitor 11. Here, the change in the relative positions between the first gear 17 and the first rack 5 is accommodated by the swinging of the first arm 14 which supports the first motor 16 and the gear 17 with a pin 12 as a center.

In this way, the monitor 11 is used in an open state. When, in the open state, a closing button (not shown) is thrown, the above-described operations are carried out in the reverse order, whereby the state changes to the closed state again. More specifically, either one of the motors 16 and 18 is operated in the opposite direction to restore the posture of the monitor 11 so that it faces the front side, after which the third motor 22 is operated in the opposite direction to restore the monitor 11 to the horizontal posture. Then, both motors 16 and 18 are operated in the opposite directions in order to rotate both gears 17 and 19 at equal speeds while they engage their corresponding first and second racks 5 and 6. This causes the movable base 10 and the monitor 11 to retreat with respect to the sliding chassis 3. Along the way, the portions with which both of the gears 17 and 19 engage switch from their corresponding first and second racks 5 and 6 to their corresponding racks 7 and 8. Thereafter, the disengaging pins 9b and 9b enter their corresponding lock grooves 40. By the inclined portions 41 and 41, the corresponding disengaging pins 9b and 9b rotate against the biasing forces of the springs S1 and S1, so that the lock levers 9 and 9 and their corresponding pins 1a and 1a disengage from each other, causing the sliding chassis 3 to withdraw with respect to the case 1. In addition, the disengaging pins 9b and 9b enter their corresponding lock portions 42 and 42, thereby placing the sliding chassis 3 and the movable base 10 in the locked state.

Both gears 17 and 19 engage their corresponding racks 7 and 8 in order to make the sliding chassis 3 and the movable base 10 to move integrally to the backmost portion of the case 1. Along the way, the first and second racks 5 and 6 move into their corresponding spaces 7a and 8a of the racks 7 and 8.

Here, the direction and angle of rotation when the viewing angle of the monitor 11 is adjusted are previously stored in a memory. By setting the details of what is to be stored in the memory as required, the series of operations which are executed from the closed state to the open state, and the series of operations which are executed from the open state to the closed state in the reverse order can all be carried out using electrical power.

The embodiment has been described by illustrating a case where either one of the first and second motors 16 and 18 is stopped and either of the other of the first and second motors 16 and 18 is operated when the viewing angle of the monitor 11 is adjusted. However, in another embodiment, both motors 16 and 18 may be operated so that both gears 17 and 19 move their corresponding first and second racks 5 and 6 in opposite directions. In still another embodiment, the rotational speed of either one of the motors 16 and 18 may be considerably increased compared to that of the other of the motors 16 and 18 in order for rotation to be carried out at the side where the speed is increased. In short, all that is required is for the relative amounts of movement between the gear 17 with respect to the first rack 5 and the gear 19 with respect to the rack 6 be different from each other.

The above-described embodiment has been described by illustrating a case where the first and second racks 5 and 6 are provided on the sliding chassis 3 which can move forward and backward with respect to the case 1. However, the sliding chassis 3 may be omitted, so that the first and second racks 5 and 6 may be directly secured to the case 1.

The above-described embodiment allows the movable base and the monitor to move forward and backward along the direction of extension of both racks by maintaining the same direction and amount of movement for the pair of gears. On the other hand, when the directions and amounts of movement of the pair of gears are made different from each other, the viewing angle of the monitor is adjusted by rotating the movable base at a location which it has been reached as a result of moving forward. Therefore, by controlling the amounts and directions of rotation of the two motors which are supported by the movable base, the forward and backward movement of the movable base and the adjustments of the viewing angle of the monitor can be carried out by a common driving system, so that the whole structure of the vehicle-mounted display system can be simplified and reduced in size.

It is to be understood that a wide range of changes and modifications to the embodiments described above will be apparent to those skilled in the art and are contemplated. It is therefore intended that the foregoing detailed description be regarded as illustrative, rather than limiting, and that it be understood that it is the following claims, including all equivalents, that are intended to define the spirit and scope of the invention.

What is claimed is:

1. A vehicle-mounted display system comprising:
   a case having a longitudinal axis;
   a movable base mounted for movement parallel to the longitudinal axis of the case;
   a first rack aligned parallel to the longitudinal axis of the case;
   a first gear engaged with the first rack;
   a first motor for driving said first gear, the first motor and first gear supported on the movable base;
   a second rack aligned parallel to the longitudinal axis of said case;
   a second gear engaged with said second rack;
   a second motor for driving said second gear, the second motor and second gear supported on the movable base;
   a third gear engaged with the movable base;
   a monitor connected with said movable base and operable to be rotated by the third gear, said monitor operable to rotate between a horizontal alignment and a raised alignment;
   wherein the first and second gears move in substantially the same amount and direction when the monitor is in the horizontal alignment; and
   wherein when the monitor is in the raised alignment, the monitor and the movable base may be rotated around a pivot axis located in between the axis of the first gear and the axis of the second gear through movement of the first and second gears in different amounts.

2. The vehicle-mounted display system of claim 1 further comprising a third motor for driving said third gear.

3. The vehicle-mounted display system of claim 1 wherein said first and second gears are aligned in the same plane.

4. The vehicle-mounted display system of claim 1 wherein said first rack further comprises a first set of ends of teeth and said second rack further comprises a second set of ends of teeth.

5. The vehicle-mounted display system of claim 4 wherein said first set of ends of teeth and said second set of ends of teeth are aligned to face away from each other.

6. The vehicle-mounted display system of claim 1 wherein the first motor and first gear are supported on the movable base by a first arm connected with said movable base and said first gear and said first motor and operable to maintain engagement between said first gear and said first rack; and
   said second motor and second gear supported on the movable base by a second arm connected with said movable base and operable to maintain engagement between said second gear and said second rack.

7. The vehicle-mounted display system of claim 6 wherein said first and second arms are axially swingably supported by said movable base.

8. The vehicle-mounted display system of claim 6 wherein said first and second arms are resiliently urged to maintain engagement between said gears and said racks.

9. The vehicle-mounted display system of claim 6 further comprising:
- a first center of swinging of said first arm located proximate to a first side of said movable base;
- a second center of swinging of said second arm located proximate to a second side of said movable base; and
- a third motor for driving said third gear.

10. A vehicle-mounted display system comprising:
- a case having a longitudinal axis;
- a movable base mounted for movement parallel to the longitudinal axis of the case;
- a first rack aligned parallel to the longitudinal axis of the case;
- a first gear engaged with the first rack;
- a first motor for driving the first gear, said first motor and first gear supported on the movable base;
- a second rack aligned parallel to a longitudinal axis of said case;
- a second gear engaged with the second rack;
- a second motor for driving the second gear;
- a guide member aligned parallel to said longitudinal axis of said case;
- a guide plate connected with the moveable base and operative to move in the direction of extension of said first guide member;
- a monitor connected with said movable base, said monitor operable to rotate between a horizontal alignment and a raised alignment;
- wherein the first and second gears move in substantially the same amount and direction when said monitor is in the horizontal alignment; and
- wherein when the monitor is in the raised alignment, the monitor and the moveable base may be rotated around a pivot axis located proximate to the guide member through movement of the first and second gears in different amounts.

11. The vehicle-mounted display system of claim 10 wherein said guide members comprises a pair of guide rails.

12. The vehicle-mounted display system of claim 11 further comprising a first guide pin connected with said guide plate and operable to restrict movement of said guide plate in the direction of the extension of said pair of guide rails.

13. The vehicle-mounted display system of claim 12 wherein said first guide pin is a center of rotation of said movable plate.

14. The vehicle-mounted display system of claim 10 further comprising:
- a first arm connected with said movable base operable to support said first gear and said first motor and maintain engagement between said first gear and said second rack and
- a second arm connected with said movable base operable to support said second gear and said second motor and maintain engagement between said second gear and said second rack.

15. The vehicle-mounted display system of claim 14 further comprising:
- a first center of swinging of said first arm located proximate to a first side of said movable base;
- a second center of swinging of said second arm located proximate to a second side of said movable base; and
- a driving mechanism for rotating said monitor located in between said first and second centers of swinging.

16. The vehicle-mounted display system of claim 14 wherein said first and second arms are axially swingably supported by said movable base.

17. The vehicle-mounted display system of claim 14 wherein said first and second arms are resiliently urged to maintain engagement between said gears and said racks.

18. The vehicle-mounted display system of claim 10 wherein said first rack further comprises a first set of ends of teeth and said second rack further comprises a second set of ends of teeth.

19. The vehicle-mounted display system of claim 18 wherein said first set of ends of teeth and said second set of ends of teeth are aligned to face away from each other.

20. The vehicle-mounted display system of claim 18 wherein said first set of ends of teeth and said second set of ends of teeth are aligned to face each other.

* * * * *

UNITED STATES PATENT AND TRADEMARK OFFICE
CERTIFICATE OF CORRECTION

PATENT NO.     : 6,731,350 B2
DATED          : May 4, 2004
INVENTOR(S)    : Masashi Endo et al.

It is certified that error appears in the above-identified patent and that said Letters Patent is hereby corrected as shown below:

Column 9,
Line 47, delete "members comprises" and substitute -- member comprises -- in its place.

Signed and Sealed this

Twenty-fifth Day of October, 2005

JON W. DUDAS
*Director of the United States Patent and Trademark Office*